Jan. 26, 1960 G. MOSER 2,922,698
OXIDATION PROCESS
Filed May 21, 1957
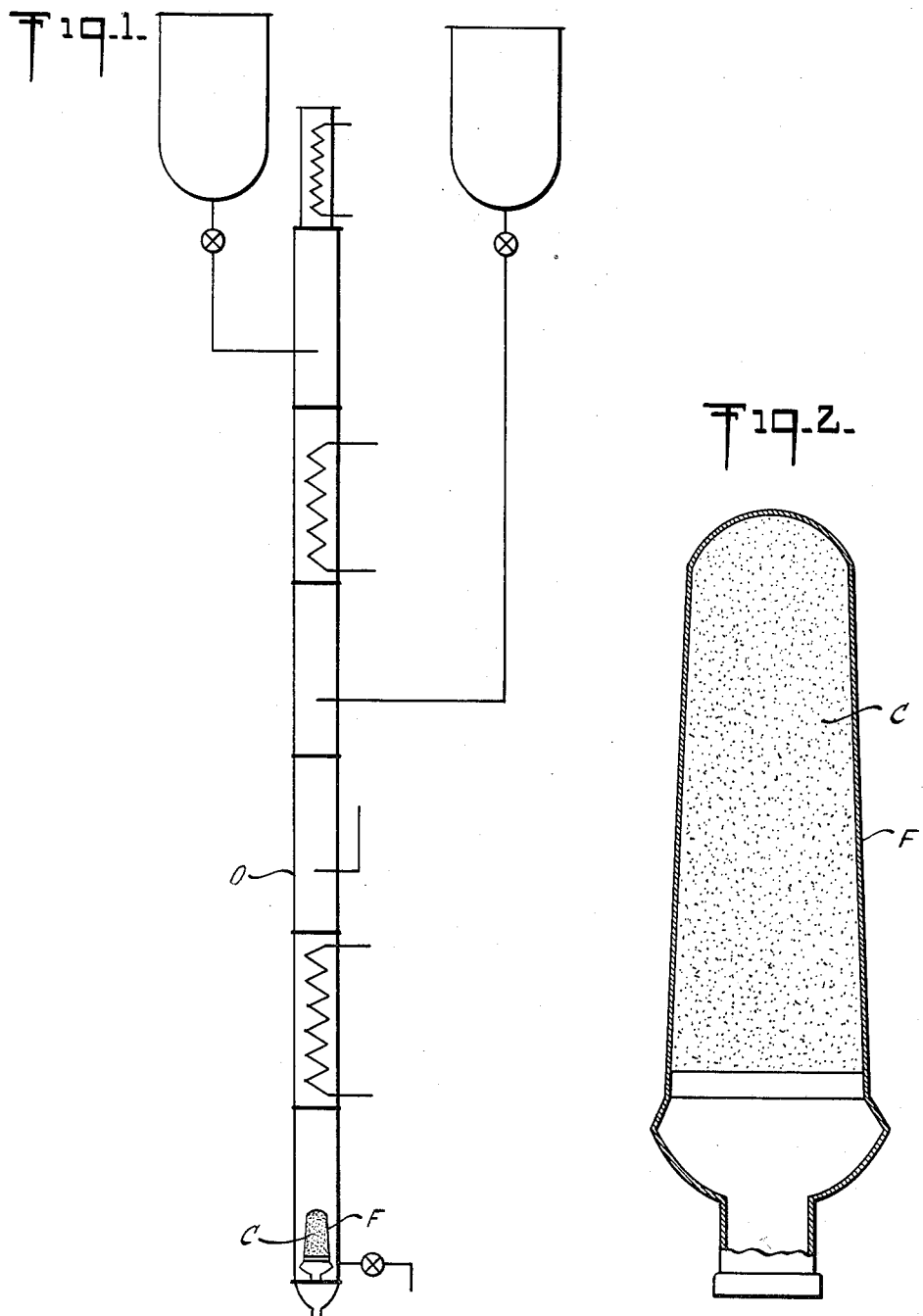
INVENTOR
GERHARD MOSER
BY
ATTORNEY United States Patent Office 2,922,698
Patented Jan. 26, 1960

2,922,698
OXIDATION PROCESS

Gerhard Moser, Karl-Marx-Stadt, Germany, assignor to VEB Fettchemie Karl-Marx-Stadt, Germany, a German National enterprise Application May 21, 1957, Serial No. 660,708

7 Claims. (Cl. 23—126)

The present invention relates to an oxidation process of substances in liquid phase by means of air in the presence of active carbon.

It is known to oxidize substances in liquid or gaseous phase by contacting them with oxygen in pure form, with air, or with oxygen-containing compounds in the presence of active carbon, with or without the use of additional catalysts. Such reactions are usually carried out at temperatures from 200–800° C.

Furthermore, it is known to effect catalytically promoted oxidations in liquid phase. Catalysts used for that purpose are mostly metals, such as platinum, silver, nickel, copper, or metal salts, e.g. mercury sulfate, cerium or ferri-sulfate, potassium permanganate, manganese stearate, manganese or iron butyrate, or metal oxides, such as aluminum oxide, iron oxide, vanadium oxide, molybdenum oxide, chromium oxide, and so on. Oxidation products of previous oxidations may likewise be used as catalysts.

The above mentioned catalysts are used in combination with active carbon, either by being precipitated thereon or being mixed therewith. Oxidations in liquid phase are also performed with active carbon in the absence of other catalysts.

Whenever oxidation occurs in liquid phase, the active carbon is in contact with the substances to be oxidized in the reaction chamber and has to be removed from the reaction mixture, which sometimes causes considerable difficulties.

It is the object of the present invention, to overcome the above mentioned difficulties when operating in the liquid phase and to provide a simple oxidation process by means of oxygen from air.

This can be accomplished according to the invention, when the oxidation of substances in liquid phase is carried out, with or without participation of other catalytic agents, by passing the air to be used, before being brought into contact with the substances to be treated, over active carbon which is arranged nearby.

For carrying out the process, active carbon is advantageously placed in a filter candle or in front of a glass frit, through which the air to be used in the oxidation is made to pass, whereupon it enters directly the liquid phase which contains the substance to be oxidized.

The catalytic action is, to a considerable extent, independent from the amount of active carbon used. The layer of active carbon can be used almost infinitely, provided soiling of the surface by paraffinic, olefinic or aromatic substances is strictly avoided. The activity of the carbon is higher, the shorter the time required by the air current to pass from the carbon layer to the goods to be treated.

In the following the invention will be illustrated by a number of examples, but it should be understood that these are given by way of exemplification and not of limitation and that many changes in the details can be made without departing from the spirit of the invention.

One of the examples describes the oxidation of an organic compound in aqueous alkaline medium, three other examples the oxidation of an organic material in acid medium, and the fifth example deals with the oxidation of an inorganic substance in the liquid phase.

*Example 1*

The solution of a reducing sugar is oxidized with air in alkaline medium for the purpose of conversion into the alkali salts of polyhydroxycarboxylic acids. The reaction products of this oxidation are valuable adjuvants in industrial processes due to their capability of forming complex compounds.

The oxidation is carried out in a glass column about 5.84 meters high and 0.2 meter wide provided with heating and cooling means. Through a filter candle made of ceramic material, 3 cubic meters of air are blown hourly into the column from below in a continuous current. The filter candle is charged inside with a mixture of 100 grams each of granular and powdered active carbon, through which the air current is led, after having first passed a layer of cotton which keeps the carbon in place and removes oily components that may be present in the air.

The oxidation column is charged first with 11 liters of 2.4% caustic soda solution warmed up to 50° C. Then 10.5 kgs. of a 58% invert sugar solution are run into the caustic soda solution in a regular stream in the course of 2½ hours while simultaneously such an amount of 23% caustic soda solution is added that the alkalinity of the solution will at all times amount to 1.2% of free alkali. After addition of the sugar was terminated, alkali addition is continued until in toto 16 kgs. of 23% caustic soda solution have been introduced into the column, the alkalinity always remaining at 1.2%. The reaction temperature is then raised to 60° C. until the amount of reducing sugar in the reaction mixture has dropped to 0.5%. Under these conditions, the oxidation will take 8½–9 hours.

When, with otherwise equal conditions, the oxidation is carried out without the air having previously passed active carbon, the time of oxidation will be 12–13 hours.

*Example 2*

Crude paraffin is oxidized in a glass column of 191 centimeters in height and 4.8 centimeters in diameter, which is provided with electric heating means. During the entire oxidation process, I introduce continuously 60 liters air per kg. paraffin per hour through a glass frit into the column from below, under pressure. At the side of the glass frit facing away from the reaction column, a layer of 5 grams of granulated active carbon is pressed thereon which is prevented from dropping back into the air admission tube by means of a cotton plug.

Into the oxidation column, 1000 grams of liquefied crude paraffin (M.P. 45° C.) are filled and heated up to 130° C. Oxidation, which is indicated by the appearance of an acid number or the separation of so called "cooler-water" or "cooler-oil," sets in after an induction time of about 6–10 hours. The time required for oxidation to proceed to an acid number of 100 amounts to 22–23 hours, induction time excluded.

When the oxidation is carried out under similar conditions, but without passage of the air through active carbon, the reaction time proper—without induction time— amounts to 32–35 hours.

*Example 3*

The same arrangement is made as in Example 2, the same layer of active carbon and the same amount of continuously admitted air are used.

Into the oxidation column, 1000 grams of liquefied crude paraffin (M.P. 45° C.) are filled simultaneously with 50 milliliters of an aqueous potassium paramanganate solution containing 1 gram dissolved $KMnO_4$, and heated to 80° C. The mixture is maintained at that temperature for 20 minutes, whereupon the temperature is raised to 120° C. and the water serving as solvent for the $KMnO_4$ is distilled off. The induction time is 1–2 hours, the oxidation time proper up to an acid number of 100 about 22 hours.

Without application of active carbon, but otherwise equal conditions, the induction time is again 1–2 hours, the oxidation time to an acid number of 100 is 30 hours.

Example 4

The same arrangement is made as in Example 2, the same layer of active carbon and the same amount of continuously admitted air are used.

Into the oxidation column, 1000 grams of crude paraffin are filled at a temperature of 70° C. and are heated up to 120° C. for driving off any water which may be present. After 10 minutes, the heater is shut off and the temperature is allowed to drop to 55–60° C. To the material prepared for oxidation, a solution of 0.5 gram $KMnO_4$ in 60 milliliters acetone, prepared by heating and subsequent filtration, is added drop by drop in the course of 10 minutes. It is held at the temperature of 55–60° C. for another 10 minutes and then heated to oxidation temperature of 120° C. During that time, acetone distills off and may be collected. Oxidation sets in immediately upon reaching the reaction temperature of 120° C. and takes about 22 hours of oxidation time proper for reaching an acid number of 100, as in Example 3, with lower amount of catalyst used.

Without passage of air through active carbon, oxidation likewise sets in at once after the oxidation temperature of 120° C. has been reached, but it takes about 30 hours to arrive at an acid number of 100.

Example 5

Iron is oxidized from the divalent to the trivalent stage of oxidation by means of oxygen from air in soda solution.

To 250 milliliters of iron-2-sulfate solution containing 558 mgs. of iron, I add 50 milliliters of a 6% soda solution. Into the reaction vessel a smoothly flowing current of air is introduced through a glass frit from below, at a flow velocity of 15 liters per hour. At the side facing away from the reaction vessel, immediately ahead of the frit, a layer of 1 gram granulated carbon is placed through which the air passes before it enters the frit. After 20 minutes, the oxidation is interrupted by addition of 40 milliliters of a 2n-sulfuric acid solution. The amount of divalent iron which escaped oxidation is determined by $KMnO_4$. The oxidized trivalent iron was calculated therefrom as amounting to 266 milligrams.

When oxidation is carried out with otherwise equal conditions, but without use of the active carbon layer, the amount of trivalent iron will only be 221 milligrams.

In the accompanying drawing, a filter candle F filled with active carbon C and an oxidation column O have been illustrated diagrammatically by way of example.

What I claim is:

1. A process for oxidizing a substance in liquid phase by means of air, which comprises placing said substance in an oxidation apparatus, heating the substance to oxidizing temperature, and passing the air before introducing it into said substance to be oxidized, through a layer of active carbon arranged outside of and closely adjacent to said oxidation apparatus, but excluding any contact of said carbon with the liquid phase inside of the oxidation apparatus.

2. A process as claimed in claim 1, which comprises providing a filtering layer ahead of said carbon layer for removing soiling matter from the air before it enters the carbon layer.

3. A process for oxidizing a reducing sugar and preparing polyhydroxy carboxylic acids therefrom, which comprises placing a solution of said sugar in an alkaline medium in an oxidation apparatus, introducing into said solution at an oxidation temperature of about 60° C. a continuous current of air previously passed through a layer of active carbon arranged outside of and closely adjacent to said oxidation apparatus but excluding any contact of the carbon with the liquid phase inside the oxidation apparatus and maintaining said solution at these conditions for several hours until the amount of sugar has dropped to about one hundredth of the amount originally present in the solution.

4. A process for oxidizing crude paraffin which comprises liquefying the paraffiin, heating it to oxdizing temperature of about 130° C. in an oxidation apparatus, passing through said paraffin a continuous current of air previously passed through a layer of active carbon arranged outside of and closely adjacent to said oxidation apparatus but excluding any contact of the carbon with the liquid phase inside the oxidation apparatus and maintaining the conditions until the reacted product reaches an acid number of 100.

5. A process for oxidizing crude paraffin which comprises liquefying the paraffin, adding thereto a solution of $KMnO_4$ in water, heating in an oxidation apparatus first to 80° C., and then heating to an oxidizing temperature of about 120° C., passing through said paraffin a continuous current of air previously passed through a layer of active carbon arranged outside of and closely adjacent to said oxidation apparatus but excluding any contact of the carbon with the liquid phase inside the oxidation apparatus and maintaining the conditions until the reacted product reaches an acid number of 100.

6. A process for oxidizing crude paraffin, which comprises liquefying the paraffin, heating it in an oxidation apparatus to 120° C. for driving off any water contained therein, cooling the paraffin to about 55–60° C., adding to said paraffin a solution of $KMnO_4$ in acetone, while maintaining the temperature at the same level, heating the solution to oxidation temperature of about 120° C., collecting the acetone drive off at that temperature, and maintaining the paraffin at oxidation temperature while passing therethrough a continuous current of air previously passed through a layer of active carbon arranged outside of and closely adjacent to said oxidation apparatus but excluding any contact of the carbon with the liquid phase inside the oxidation apparatus until the acid number of 100 has been reached.

7. A process for oxidizing iron from the divalent to the trivalent stage of oxidation which comprises introducing into an iron-2-salt solution in an oxidation apparatus in soda solution a continuous current of air previously passed through a layer of active carbon arranged outside of and closely adjacent to said oxidation apparatus but excluding any contact of the carbon with the liquid phase inside the oxidation apparatus, until the desired amount of iron-3-salt has been formed.

References Cited in the file of this patent

UNITED STATES PATENTS

| | | |
|---|---|---|
| 2,357,096 | Fireman | Aug. 29, 1944 |
| 2,365,729 | Schumacher et al. | Dec. 26, 1944 |
| 2,447,794 | Brewer | Aug. 24, 1948 |
| 2,472,168 | Mehltretter et al. | June 7, 1949 |

OTHER REFERENCES

Hilditch: "Catalytic Processes in Applied Chemistry," pages 238–242. D. Van Nostrand Co., New York, 1929.